Patented Sept. 18, 1945

2,384,886

UNITED STATES PATENT OFFICE 2,384,886

VINYLIDENE CHLORIDE COMPOSITIONS

Edgar C. Britton, Midland, Mich., assignor to The Dow Chemical Company, Midland, Mich., a corporation of Michigan No Drawing. Application July 18, 1941,
Serial No. 403,019

5 Claims. (Cl. 260—17)

This invention relates to thermoplastic compositions comprising polymeric vinylidene chloride products modified with cellulose ethers, and particularly to compositions containing water-insoluble thermoplastic cellulose ethers.

As herein used, the term "polymeric vinylidene chloride product" includes the polymer of vinylidene chloride alone and other products, whether polymers, co-polymers, interpolymers, or otherwise named, which may be obtained by polymerizing together monomeric vinylidene chloride and one or more of the monomers of other polymerizable materials, such as vinyl chloride, vinyl acetate, vinyl ethers, acrylic and methacrylic acids and esters thereof, acrylic nitrile, butadiene, styrene, allyl chloride and the allyl, methallyl, crotonyl, 2-chloroallyl, or cinnamyl esters of mono and dicarboxylic acids. The polymer of vinylidene chloride alone is described in U. S. Patent No. 2,160,903 and many of its co-polymers with other polymerizable compounds, as well as certain plasticized compositions comprising these co-polymers, and ways in which the products may be made, are described in U. S. Patents 2,160,904; 2,206,022; 2,215,379 and 2,160,931 to 2,160,948, inclusive.

According to the present invention water-insoluble thermoplastic cellulose ethers are incorporated with a polymeric vinylidene chloride product to produce a mass which can easily be molded or extruded to form articles having a high gloss, and a durable finish resistant to abrasion. For example, a water-insoluble thermoplastic cellulose ether may be incorporated with a polymeric vinylidene chloride product having a softening point only slightly below its decomposition point to produce a mass that can be molded or extruded at relatively low temperatures and pressures to form valuable articles, threads, bands, filaments, foils and the like, that are flexible, and which retain most of the high tensile strength and toughness shown by the parent polymeric vinylidene chloride product. Furthermore, though apparently compatible at fusion temperatures water-insoluble thermoplastic cellulose ethers become incompatible at room temperature with polymeric vinylidene chloride products, and produce a pigmented effect in the cold product. The thermoplastic masses can be molded or extruded to form articles which are stable to heat, have a white color, and a high degree of flexibility. Water-insoluble thermoplastic cellulose ethers are particularly advantageous for producing thermoplastic compositions that have a white color. Being thermoplastic they do not produce the deleterious effects that are obtained when non-plastic pigments are added to produce a colored composition. Furthermore, water-insoluble thermoplastic cellulose ethers do not decompose polymeric vinylidene chloride products in the presence of heat and they do not have any increased abrasive action on the extrusion dies. In many instances incorporating a water-insoluble thermoplastic cellulose ether with a polymeric vinylidene chloride product produces a mass that is substantially more compatible with many lacquer solvents than the polymeric vinylidene chloride product alone.

Examples of water-insoluble thermoplastic cellulose ethers which have been tested and found suitable for the above purposes include ethylcellulose, propylcellulose, butylcellulose, benzylcellulose, and the mixed cellulose ethers such as, ethylbutylcellulose, methylpropylcellulose, ethylbenzylcellulose, and ethyllaurylcellulose wherein the number of substituted groups is at least 2.2 per cellulose unit.

The addition of the water-insoluble thermoplastic cellulose ethers to the polymeric vinylidene chloride product may be effected by any of several methods. For example, the polymeric vinylidene chloride product and the particular water-insoluble thermoplastic cellulose ether to be employed may be mixed or ground together in a ball mill or other suitable mixer commonly employed in the plastic art, or they may be mixed on hot rolls in a method similar to compounding rubber compositions. Another satisfactory method of incorporating the water-insoluble thermoplastic cellulose ethers with the polymeric vinylidene chloride product is to dissolve the cellulose ether in a readily volatile solvent and mix or grind the materials in any suitable apparatus such as a ball mill, thereafter evaporating the solvent. To effect complete homogenization of the composition, it should preferably be heated to a fusion temperature.

The following examples illustrate the practice of my invention but are not to be construed as limiting the scope thereof:

*Example 1*

2.5 grams of ethylcellulose, and 5.0 grams of 1,2-epoxy-3-(2-phenylphenoxy) propane, to serve as a plasticizer and heat stabilizer, were incorporated with 20 milliliters of acetone. To this solution was added 42.5 grams of a co-polymer consisting of 90 per cent vinylidene chloride and 10 per cent vinyl chloride. The mixture was ground until thoroughly blended and then dried.

The composition could easily be molded or extruded and filaments, having a diameter of 0.020 inch, prepared from this material were tough flexible opaque white threads and had a tensile strength above 43,000 pounds per square inch.

*Example 2*

3.75 grams of ethylcellulose and 2.5 grams of 1,2 - epoxy-3-(2-phenylphenoxy) propane, were incorporated with 20 milliliters of acetone. To the resulting solution was added 43.75 grams of a co-polymer consisting of 90 per cent vinylidene chloride and 10 per cent vinyl chloride. The mixture was ground until thoroughly blended and then dried. The composition could easily be molded or extruded and filaments, having a diameter of 0.020 inch, prepared from this material were flexible white threads with a glossy finish and had a tensile strength above 28,000 pounds per square inch.

*Example 3*

0.5 gram of ethylcellulose and 2.5 grams of 1,2-epoxy-3-(2-phenylphenoxy) propane were incorporated with 20 milliliters of acetone. To this solution was added 47.0 grams of a co-polymer consisting of 90 per cent vinylidene chloride and 10 per cent vinyl chloride. The mixture was ground until thoroughly blended and then dried. The composition could easily be molded or extruded and filaments having a diameter of 0.018 inch, prepared from this material were tough glossy white threads and had a tensile strength above 45,000 pounds per square inch.

*Example 4*

1.5 grams of ethylcellulose and 3.5 grams of di-alpha-phenylethyl) ether, to serve as a heat stabilizer and plasticizer, were incorporated with 20 milliliters of acetone. To this solution was added 45.0 grams of a copolymer consisting of 90 per cent vinylidene chloride and 10 per cent vinyl chloride. The mixture was ground until thoroughly blended and then dried. The composition could easily be molded or extruded and filaments having a diameter of 0.017 inch, prepared from this material were opaque flexible white threads and had a tensile strength above 32,000 pounds per square inch.

*Example 5*

2.5 grams of ethylcellulose containing 0.05 gram of anthraquinone Green G Base (an organic dye-color index No. 1078), and 2.5 grams of 1,2-epoxy-3-(2-phenylphenoxy) propane to serve as a heat stabilizer, were incorporated with 20 milliliters of acetone. To this solution was added 45.0 grams of a co-polymer consisting of 90 per cent vinylidene chloride and 10 per cent vinyl chloride. The mixture was ground until thoroughly blended and then dried. The composition could easily be molded or extruded and filaments, having a diameter of 0.022 inch, prepared from this material were opaque flexible glossy threads with a pale green color and had a tensile strength above 40,000 pounds per square inch.

*Example 6*

0.5 gram of benzylcellulose and 0.25 gram of 1,2-epoxy-3-(2-phenylphenoxy) propane, to serve as a heat stabilizer, and 6.0 grams of a mixture consisting of 60 parts by weight di-(4-tert.-butylphenyl) mono-phenyl phosphate and 40 parts by weight di-(4-tert.-butylphenyl) mono-(5-tert.-butyl-2-xenyl) phosphate, to serve as a plasticizer, were incorporated in 20 milliliters of acetone. To this solution was added 43.25 grams of a co-polymer consisting of 90 per cent vinylidene chloride and 10 per cent vinyl chloride. The mixture was ground until thoroughly blended and then dried. The composition could easily be molded or extruded and filaments, having a diameter of 0.012 inch, prepared from this material were flexible translucent white threads and had a tensile strength above 39,000 pounds per square inch.

*Example 7*

1.0 part by weight benzylcellulose was incorporated with 6.0 parts by weight di-(4-tert.-butylphenyl) monophenyl phosphate and 4.0 parts by weight di-(4-tert.-butylphenyl) mono-(5-tert.-butyl-2-xenyl) phosphate. To 2.2 parts by weight of this solution was added 7.8 parts by weight of a co-polymer consisting of 90 per cent vinylidene chloride and 10 per cent vinyl chloride. The mixture was ground until thoroughly blended and then molded between heated flat nickel plates at about 160° C. The product was a highly flexible tough transparent sheet.

*Example 8*

5.0 grams of ethylcellulose and 2.5 grams of 1,2-epoxy-3-(2-phenylphenoxy) propane were incorporated with 20 milliliters of acetone. To this solution was added 42.5 grams of a co-polymer consisting of 90 per cent vinylidene chloride and 10 per cent vinyl chloride. The mixture was ground until thoroughly blended and then dried. The composition could easily be molded or extruded and filaments having a diameter of 0.025 inch, prepared from this material were opaque white glossy threads and had a tensile strength above 15,000 pounds per square inch.

The proportion of water-insoluble thermoplastic cellulose ether to be employed in the new compositions depends upon the hardness, toughness, strength and flexibility desired in the modified composition. For example, compositions for use in injection molding must flow well at molding temperatures but should harden rapidly at lower temperatures. They should be hard enough when cold to withstand scratching and tough enough to withstand shock. Compositions for use in making thin films, foils, or filaments should have high flexibility at all temperatures met with in service and be sufficiently hard and tough to withstand abrasion. Similarly, lacquer coatings must be hard, tough and possess good adherence and flexibility. The exact proportion of modifying agent to be employed in preparing the new compositions will depend on the use requirements. In general from about 0.5 to about 90 per cent of the water-insoluble thermoplastic cellulose ether may be employed, based on the weight of the polymeric vinylidene chloride product with which they are incorporated. When it is desired simply to produce a product having improved molding and extruding properties and which can be worked to form useful articles, threads, bands, filaments, foils and the like having a white color and which retain the high tensile strength shown by the parent polymeric vinylidene chloride product, the amount of the water-insoluble thermoplastic cellulose ether will ordinarily vary from about 0.5 to about 10 per cent, and more specifically, from about 2 to about 7.5 per cent. When, however, it is desired to produce compositions for molding which have good flow properties at molding temperatures, and where high tensile strength is of relatively lesser value the amount of water-insoluble thermoplastic cellulose ether employed may vary from about 10 to about 90 per cent. These latter compositions are substantially more compatible with many of the commonly used lacquer solvents and may be advantageously used in preparing lacquers and varnishes.

While the above examples show the preparation of compositions from a polymeric vinylidene chloride product consisting of a co-polymer of 90 percent vinylidene chloride and 10 per cent vinyl chloride, incorporated with water-insoluble thermoplastic cellulose ethers, other polymeric vinylidene chloride products which have wide commercial value and which may be advantageously used in preparing the new compositions include the co-polymers containing from about 5 to about 30 per cent of vinyl chloride and correspondingly from about 95 to about 70 per cent of vinylidene chloride. Other co-polymers, in like proportions with vinylidene chloride, as included herein under the definition of the term, "polymeric vinylidene chloride product," form equally valuable compositions.

In preparing molded or extruded articles from the new polymeric vinylidene chloride compositions at temperatures above their respective softening points, where the material is often maintained for a considerable period of time, it is desirable to have present in the composition a heat-stabilizing agent which acts to decrease or prevent thermal decomposition. In many instances a substance which also acts as a plasticizer is often desirable. Compounds applicable for these purposes include 1,2-epoxy-3-(2-phenylphenoxy) propane, tributyl aconitate, allyl disulfide, 2-chloroallyl disulfide, 2,2'-(dihydroxy-benzophenone), dipropyl maleate, butyl cinnamate, and di-(alpha-phenylethyl) ether.

When the new compositions are to be worked to produce articles having an opaque white color, it is apparent that the substances added to the compositions to serve as plasticizers and heat-stabilizing agents must not render the cellulose ethers campatible with the polymeric vinylidene chloride products. When the compounds added for the above purposes are solubilizing agents, the compositions cannot be used to prepare articles which have an opaque white color without also adding a pigment. As pointed out elsewhere in the specification the opaque white color of articles prepared from the new compositions is produced because the water-insoluble thermoplastic cellulose ethers are incompatible with the polymeric vinylidene chloride products at ordinary temperatures. However, compositions containing a polymeric vinylidene chloride product and a water-insoluble thermoplastic cellulose ether can easily be made compatible by adding a solubilizing agent such as for example, tricresyl phosphate, di-(4-tert.-butylphenyl) monophenyl phosphate, tri - (4 - tert. - butylphenyl) phosphate, or di-(4-tert.-butylphenyl) mono-(5-tert.-butyl-2-xenyl) phosphate.

The amount of solubilizing agent to be employed will ordinarily vary from about 5 to about 30 per cent based on the weight of the polymeric vinylidene chloride product water-insoluble thermoplastic cellulose ether compositions with which they are incorporated but more or less than the suggested amounts may be used.

The incorporation of minor amounts of coloring agents, plasticizers, fillers, and the like has been found advantageous and desirable when used in such amounts that they do not impair the useful properties of the product. Articles produced from compositions containing a dye or coloring agent, and particularly when extruded in the shape of threads, bands, filaments, foils, and the like, are very striking and may be useful in their extruded form or they may be woven into fabrics, baskets, belts, seat covers, or other useful articles.

In practicing the invention to produce colored masses the dye or coloring agent is preferably added to the water-insoluble thermoplastic cellulose ether and then incorporated with the polymeric vinylidene chloride product. It has been found that water-insoluble thermoplastic cellulose ethers act as carriers or dispersing agents for dyes, coloring agents, and pigments, particularly when they are incorporated with polymeric vinylidene chloride products, and distribute them uniformly throughout the compositions. Many dyes, coloring agents, and pigments cannot readily be incorporated with polymeric vinylidene chloride products but can readily be incorporated with water-insoluble cellulose ethers. It is, therefore, of particular advantage first to add the dye, coloring agent, or pigment to the cellulose ether and then to incorporate this material with the polymeric vinylidene chloride product.

It is apparent that any desired degree of color, ranging from light tints to dark values, can be obtained in the final product by varying the amount of coloring agent added to the water-insoluble thermoplastic cellulose ether and by varying the amount of the colored cellulose ether incorporated with the polymeric vinylidene chloride product. For example, a relatively large amount of a coloring agent may be added to a water-insoluble thermoplastic cellulose ether to form a highly colored mass. Only a small amount of this highly colored material is required, when incorporated with a polymeric vinylidene chloride product, to produce a composition which can be extruded to form opaque glossy threads that have a soft subdued color of the type often referred to as pastel shades. The colors are uniformly distributed throughout the product and are not just on the surface as is the case with many "dyed" plastic strands.

As will be seen from the above description, the properties of polymeric vinylidene chloride products can be varied widely, according to the amount of water-insoluble thermoplastic cellulose ether incorporated therein, to produce products that are useful in the preparation of articles of all kinds. The herein described compositions have, among others, the following advantages: (1) they may be molded, drawn and extruded at moderate temperatures and pressures to form articles having a white color, or a pastel shade, as desired, a glossy finish, and which retain most of the high tensile strength and toughness shown by the parent product, (2) they are heat stable masses, (3) they are substantially more compatible with many lacquer solvents than is the polymeric vinylidene chloride product alone, (4) molded or extruded articles prepared therefrom are resilient and resistant to abrasion and (5) they are substantially unaffected by most acids, bases, and oxidizing agents.

Other modes of applying the principle of my invention may be employed instead of those explained, change being made as regards the materials employed, provided the product recited in the following claims be obtained.

I therefore point out and distinctly claim as my invention:

1. An opaque thermoplastic composition, the essential ingredients of which are a copolymer of from about 5 to about 30 per cent of vinyl chloride and correspondingly from about 95 to about 70 per cent of vinylidene chloride, and from about 0.5 to about 10 per cent, based on the total weight of the polymer, of a water-insoluble cellulose ether incompatible at room temperature with the said copolymer.

2. An opaque thermoplastic composition, the essential ingredients of which are a polymer of vinylidene chloride, wherein the vinylidene chloride constitutes at least 70 per cent of the polymer, and from about 0.5 to about 10 per cent, based on the total weight of the polymer, of a water insoluble thermoplastic cellulose ether which is incompatible at room temperature with the polymer.

3. An opaque thermoplastic composition, the essential ingredients of which are a polymer of vinylidene chloride, wherein the vinylidene chloride constitutes at least 70 per cent of the polymer, and between about 2 and about 7.5 per cent, based on the weight of the polymer, of a thermoplastic ethyl cellulose incompatible at room temperature with the polymer.

4. An opaque thermoplastic composition, the essential ingredients of which are a polymer of vinylidene chloride, wherein the vinylidene chloride constitutes at least 70 per cent of the polymer, and from about 0.5 to about 10 per cent, based on the total weight of the polymer, of a thermoplastic benzyl cellulose incompatible at room temperature with the polymer.

5. An opaque thermoplastic composition, the essential ingredients of which are a polymer of vinylidene chloride, wherein the vinylidene chloride constitutes at least 70 per cent of the polymer, and from about 0.5 to about 10 per cent, based on the total weight of the polymer, of a water insoluble thermoplastic cellulose ether containing at least 2.2 ether groups per cellulose unit, which ether is incompatible at room temperature with the polymer.

EDGAR C. BRITTON.